United States Patent [19]

Flies

[11] 4,297,569
[45] Oct. 27, 1981

[54] MICROELECTRONIC MEMORY KEY WITH RECEPTACLE AND SYSTEMS THEREFOR

[75] Inventor: William P. Flies, Frontenac, Minn.

[73] Assignee: Datakey, Inc., Minneapolis, Minn.

[21] Appl. No.: 52,773

[22] Filed: Jun. 28, 1979

[51] Int. Cl.³ .................... G06K 7/06; G06K 19/00; E05B 47/06
[52] U.S. Cl. .................... 235/443; 235/384; 235/487; 340/149 A; 70/283
[58] Field of Search ............ 235/443, 419, 487, 488, 235/384; 340/149 R, 149 A; 70/DIG. 51; 200/44

[56] References Cited

U.S. PATENT DOCUMENTS

| | | | |
|---|---|---|---|
| 2,981,935 | 4/1961 | Nasoni | 365/59 |
| 3,098,996 | 7/1963 | Kretzmer | 365/102 |
| 3,098,997 | 7/1963 | Means | 365/102 |
| 3,544,769 | 12/1970 | Hedin | 235/432 |
| 3,641,498 | 2/1972 | Hedin | 340/164 R |
| 3,651,464 | 3/1972 | Hedin et al. | 340/149 R |
| 3,660,831 | 5/1972 | Nicola et al. | 200/44 |
| 3,673,467 | 6/1972 | Eisenreich | 338/260 |
| 3,686,659 | 8/1972 | Bostrom | 340/149 R |
| 3,754,214 | 8/1973 | Matsumoto et al. | 340/149 A |
| 3,761,892 | 9/1973 | Bosnyak | 340/149 A |
| 3,806,882 | 4/1974 | Clarke | 340/149 R |
| 3,812,403 | 5/1974 | Gartner | 340/147 R |
| 3,842,629 | 10/1974 | Pazer et al. | 340/149 A |
| 3,845,362 | 10/1974 | Roe | 340/149 A |
| 3,848,229 | 11/1974 | Perron | 340/149 A |
| 3,859,634 | 1/1975 | Perron et al. | 340/149 A |
| 3,870,866 | 3/1975 | Halpern | 235/384 |
| 3,872,435 | 3/1975 | Cestaro | 340/147 MD |
| 3,889,501 | 6/1975 | Fort | 70/283 |
| 3,971,916 | 7/1976 | Moreno | 364/200 |
| 4,023,161 | 5/1977 | Sasaki | 340/149 R |
| 4,179,064 | 12/1979 | Yoshioka et al. | 235/487 |
| 4,211,919 | 7/1980 | Ugon | 235/487 |

FOREIGN PATENT DOCUMENTS

| | | |
|---|---|---|
| 1321529 | 11/1963 | France . |
| 2146802 | 5/1973 | France . |
| 2353103 | 12/1977 | France . |
| 2363837 | 3/1978 | France . |

Primary Examiner—Robert M. Kilgore
Attorney, Agent, or Firm—Schroeder, Siegfried, Ryan, Vidas, Steffey & Arrett

[57] ABSTRACT

This invention relates to electrical key-like devices, to electrical receptacles for use in combination therewith and to electronic circuitry systems, such as computers and other operating circuits, that interface with the key-like devices through the receptacle. The keys contain a microelectronic circuit element, eg., a microelectronic circuit chip or die, having an electrical lead or leads exposed along the length of the key for contacting electrical leads in the receptacle when the key is inserted therein and rotated to a "locked" position. The keys are particularly designed to interface with a processor and program memory system, that is, a computer.

18 Claims, 18 Drawing Figures

MICROELECTRONIC MEMORY KEY WITH RECEPTACLE AND SYSTEMS THEREFOR

I. DESCRIPTION

BACKGROUND OF THE INVENTION

Electrical devices of various types have been proposed in which a master circuit or electrical operating system of some kind, such as a computer system, is activated by use of a portable device that is combined with the electrical system, as by insertion into a slot or the like. This invention is concerned broadly with such portable devices and with such systems. However, it is specifically concerned with electrical key-like devices that carry data in the form of a microelectronic circuit component, chip or die and will be so specifically described herein as a preferred embodiment of the invention. Such a key-like device is sometimes referred to herein as a microelectronic data key, a memory key, a data key or simply a key. The electrical system with which the key is typically used will take the form of a computer, that is an electrical circuit means including a program memory and a processor. An example of such a means is described herein.

There exists a need for key-like devices that can retain relatively large amounts of data bits (information) in a portable medium with small size and very fast data access and data transfer rates (times). It is desirable that such a storage/access device or key be of very sturdy construction and of a size that can be enclosed within one's hand. It should have no moving parts so that reliability is maximized and access time is minimized. Its storage media should have the capability of being easily customized to required data patterns.

Moving memory devices do not satisfy these requirements because they are too large and are very susceptible to data damage if continually being handled in every day environments. Stationary memory devices, although small, must be a part of the computer circuitry to be accessed. These devices heretofore have had to be soldered or expertly placed into circuits by experienced individuals in order to be used.

The portable access type memories heretofore in use, such as magnetic strip cards, punched cards, etc. that are of a portable size, contain only very limited data capacities. These devices are also very susceptible to data damage, as by magnetic fields, and to physical damage.

The key device described herein, ie., in its preferred form as a microelectronic data key, provides relatively large amounts of data bit storage with very fast access time and in a very durable medium. The microelectronic data key described herein is not only concerned with the storage of data (information) and its introduction into a computer or other electrical circuit system, but also with the portability of microelectronic circuit chips or dies, whether the purpose of the electrical circuit system into which the key is introduced is the storage of information or any other purpose.

SUMMARY OF THE INVENTION

Microelectronic memory or data storage circuits, although extremely small, are currently not portably usable in a form that can be routinely inserted or otherwise connected into a computer or the like for use and then removed therefrom following completion of a desired input function. The design of the microelectronic key of this invention facilitates the application of microelectronic devices as such portable devices. The microelectronic device is packaged in a sturdy configuration that may be inserted into a receptacle of an access device or the like for a variety of purposes. The primary concern of the preferred embodiment is the capability of carrying large amounts of data in a protected key-like device that can be accessed very rapidly into a computer or the like. The device is small enough to be carried on the person.

The device provides unique microelectronic packaging and electrode access that facilitates the portability of a directly usable microelectronic circuit or other electrical circuit components. The particular purpose of any microelectronic or other circuit component utilized in the devices and systems of this invention is not important within the broad scope of the invention. Any circuit that is portable and can augment any other existing circuit is usable in the context of this invention. The key-like device is specifically designed for insertion into a receptacle and rotation therein to a "locked" position by twisting to establish contact through the receptacle to a master system, such as a computer or the like.

The invention also comprises the overall combination of an electrical system, a receptacle and a key.

DESCRIPTION OF THE PREFERRED EMBODIMENTS

Figure 1:
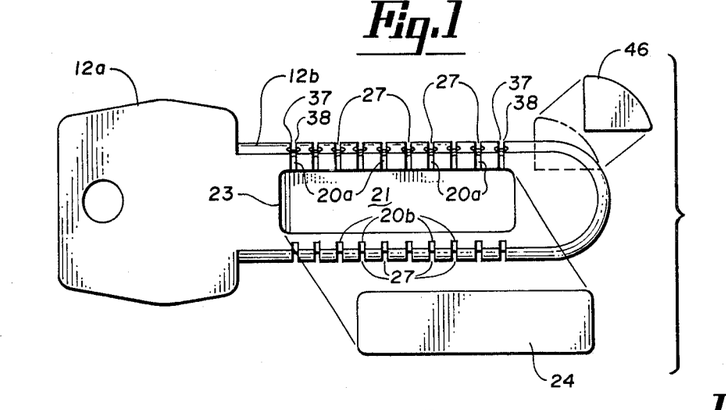
FIG. 1 is a side elevation of the key-like device of the invention with parts exploded.
Figure 2:
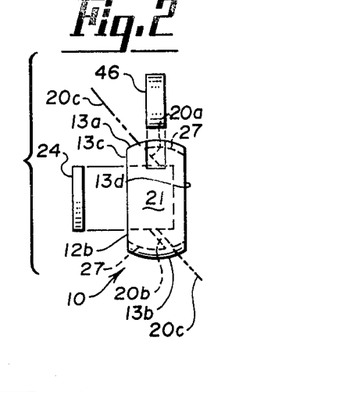
FIG. 2 is a right end elevation of the elements of FIG. 1 with parts exploded.
Figure 3:
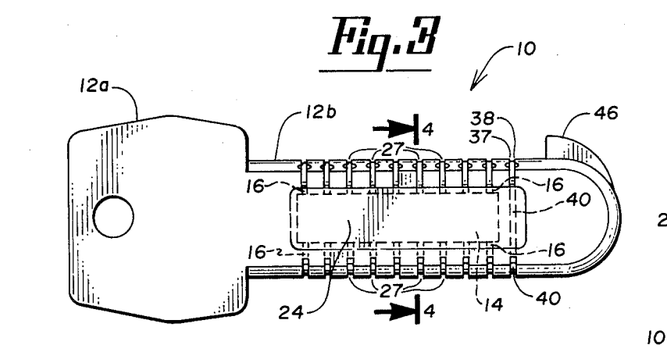
FIG. 3 is a side elevation of a fully assembled key device of the invention.
Figure 4:
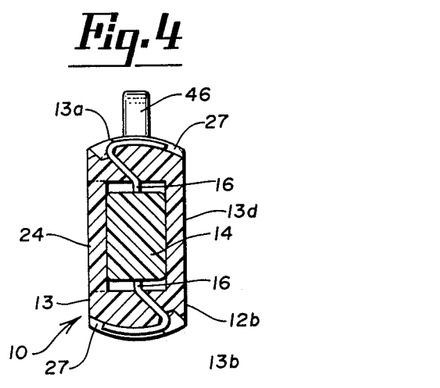
FIG. 4 is a cross section taken along line 4—4 of FIG. 3.
Figures 4A, 5, 6, 9:
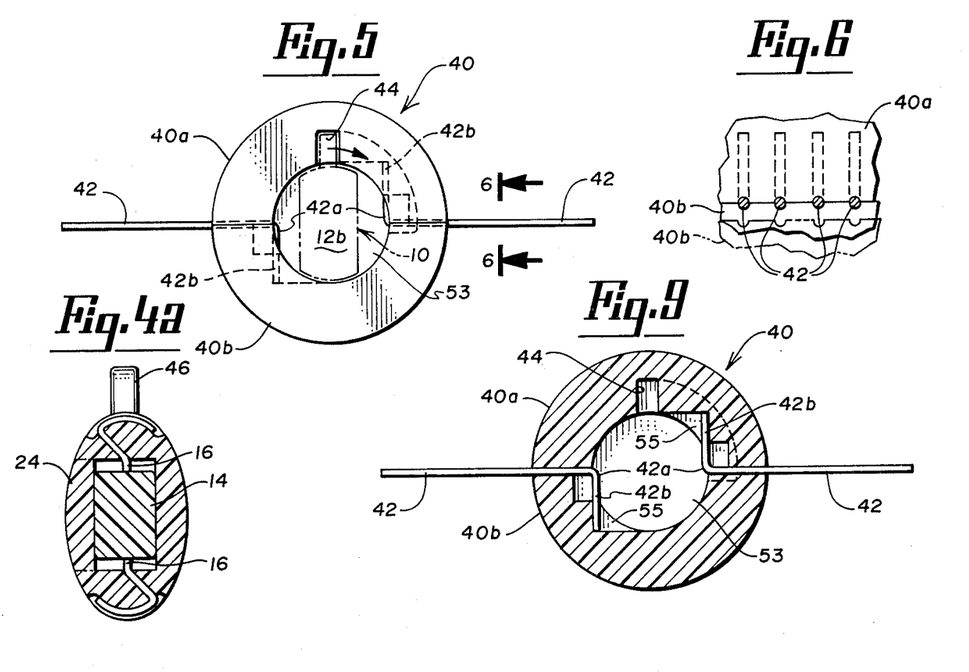
FIG. 4a is a showing similar to FIG. 4 but of an elliptical cross-section.
FIG. 5 is a left or keyway end elevation of the key receptacle of the invention with the key shown in phantom as inserted and about to be turned clockwise as indicated by the arrow to a locked position at 90°.
FIG. 6 is a detail view of the receptacle taken along line 6—6 of FIG. 5 showing in phantom the lower part of receptacle before assembly.
FIG. 9 is a cross sectional elevation taken along line 9—9 of FIG. 8.

Referring now to the drawings, and particularly to FIGS. 1, 2, 3, and 4, there is shown a preferred embodiment of a portable, random access, data device, or key generally designated 10. Key 10 is comprised of nonconductive head and insert body portions 12a and 12b, respectively. Body insert portion 12b, as shown in FIGS. 2 and 4, is generally rectangular in cross-section having a major dimension between upper and lower curved surfaces 13a and 13b, and a minor smaller dimension between flat sides surfaces 13c and 13d. Body insert portion 12b need not have flat sides 13c and 13d. The body portion may be formed in cross-section in the shape of an ellipse as schematically indicated in FIG. 4a.

Preferably, the key 10 will be made of molded nonconductive plastic. A microelectronic circuit element 14 (shown in FIGS. 3 and 4), such as a microelectronic random access memory device, is encapsulated in key 10. The bit capacity of the microelectronic memory device 14 is selected to be consistent with a particular desired application and may be chosen with capacities ranging typically between 256 bits and 16,348 bits, dependent upon the type of memory selected. Microelectronic memory devices of the EPROM (erasable programmable memory), ROM (read only memory), PROM (programmable read only memory), and EAROM (electrically alterable read only memory), or magnetic domain memory such as bubble memory, may all be used depending upon the specific overall system design.

As shown in FIG. 3, the microelectronic memory device 14 has a number of electrical leads 16. The number of leads 16 from microelectronic device 14 is dependant upon the specific type of chip or die selected for use in key 10. Use of common microelectronic memory devices presently available, such as Texas Instruments TI Ser. No. 745,288 and TI Ser. No. 745,472, or General Instruments GI ER1400 results in lead counts ranging typically from eight to forty pins. In addition to microelectronic memory devices 14, microelectronic devices other than memories and the like may also be encapsulated within the data key package 10 for temporary introduction into dynamic higher level circuits.

Microelectronic device 14 is enclosed within body 12 of data key package 10 such that the leads 16 are accessable from the exterior of the key.

FIGS. 2 and 4 show in cross-section the insert body portion 12b of data key element 10 and illustrate the positioning of memory device 14 and leads 16 therein. The leads 16 are brought to the exterior of body portion 12b of key element 10 through rows of openings 20a and 20b which extend from the inner cavity 21 of body portion 12b through to opposite surfaces of the key as shown in FIG. 1.

As also shown in FIG. 1, an access opening 23 is formed in body 12b to give access to cavity 21 into which memory device 14 is installed. An access door 24 is used to close opening 21. Also as shown in the Figures, a number of grooved openings 20a are formed in body 12b at the upper perimeter of access opening 23 and holes 20b are formed in the lower perimeter of access opening 23 to form a number of access openings when door 24 is secured into place to close access opening 23 and seal cavity 21.

During installation of memory device 14 in key 10, its leads 16 are inserted into grooves 20a and holes 20b when the memory device 14 is inserted in cavity 21. This assures that leads 16 from memory device 14 are positioned in the openings 20 so that leads 16 will project therefrom as indicated by the dotted lines 20c in FIG. 2. Memory device 14 is cemented into place in body portion 12b of key 10 and cover 24 is then cemented into place. The size of cavity 21 is determined by the size of memory device 14 so that when door 24 is adhesively secured to body portion 12b it may also be adhesively secured to the face of memory device 14 opposite from the face previously adhesively secured to body portion 12b. After memory device 14 is fully encased within the body of the key, the protruding ends of leads 16 are positioned in transverse grooves 27 appearing across the upper and lower surfaces 13a and 13b of body portion 12b. The leads may be easily bent into the proper position within the protective transverse grooves 27 by utilizing two rows of heated heads to make contact with the surface of the leads and urge them into contact with the curved surfaces 13a and 13b of body portion 12b. Heating leads 16 permits them to be more easily deformed and allows them to be slightly indented into the transverse grooves 27. As can be seen in FIGS. 2 and 4, the major surface portions 13a and 13b of the key upon which leads 16 are in contact has a major dimension with the center line of the circular cross section being coincident with the center line of the body portion 12b.

In cases where microelectronic memory device 14 is an erasable programmable read only memory, either door 24 or the opposite side of key body 12b may include a quartz window to permit introduction of ultraviolet radiation from an external source to erase the memory.

Referring now to FIGS. 5, 6, and 9, the key receptacle 40 will be described. FIG. 5 shows a keyway end elevation of receptacle 40 and FIG. 9 a cross section of the receptacle. Receptacle 40 includes a plurality of contacts 42 which are positioned to make contact with the memory device 14 leads 16 shown in the FIGS. 1-4.

Figure 7:
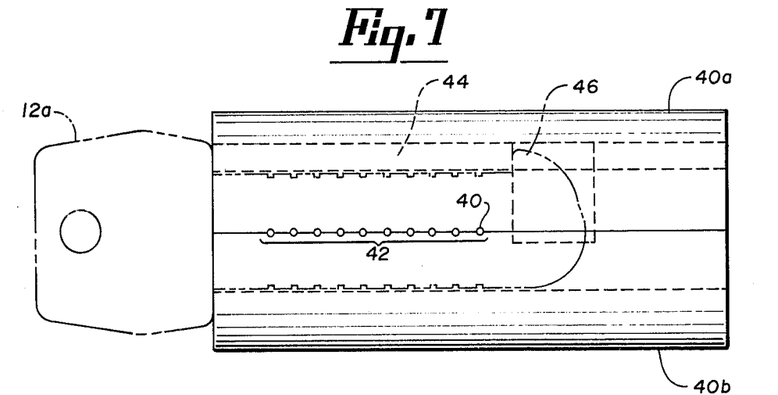
FIG. 7 is a side elevation of the receptacle with the key inserted and shown in phantom.

The data key receptacle is preferably formed from molded plastic of the same kind used to make key 10 and it may be made in one or more parts 40a and 40b, as is convenient. The receptacle includes one or more insertion guide means such as a longitudinal insertion groove 44 which runs the length of the data key receptacle, as can be seen in FIG. 7. Longitudinal insertion groove 44 cooperates with the protrusions 46 on key 10. The cooperation between protrusion 46 and the insertion groove 44 assures proper orientation of the data key within the access device for reading and avoids any possibility of insertion of the key with any degree of misalignment.

In addition to insertion groove 44, receptacle 40 also includes one or more rotation guide means such as radial turn guidance grooves 49 to permit rotation of the key about its axis by approximately 90 degrees to bring the spaced contacts carried by the key into a proper contacting and data reading relationship with the correspondingly spaced contacts 42 carried by receptacle 40.

Receptacle 40 as shown in FIG. 9 has its contacts 42 positioned and configured such that they possess an inherently spring loaded force when data key 40 is rotated into contact with them. The right angle bends 42a formed at the interior end portions of the leads 42 provide resilient contact surfaces in the receptacle. The ends 42b are fixedly held in grooves in the receptacle. They point or extend in opposite directions on opposite sides of the receptacle and exert spring pressure in a counter-clockwise direction against the contacts carried by data key 10. Since the pressure exerted by the receptacle contacts 42 against the contacts on the body of the data key is opposite to the force required to turn the data key, full contact will be achieved between the receptacle and its respective data key contacts with adequate tolerance to movement to tolerate the amount of misalignment of the data key which may occur through tolerance buildup in the manufacture of the keys and receptacles.

Figure 10:
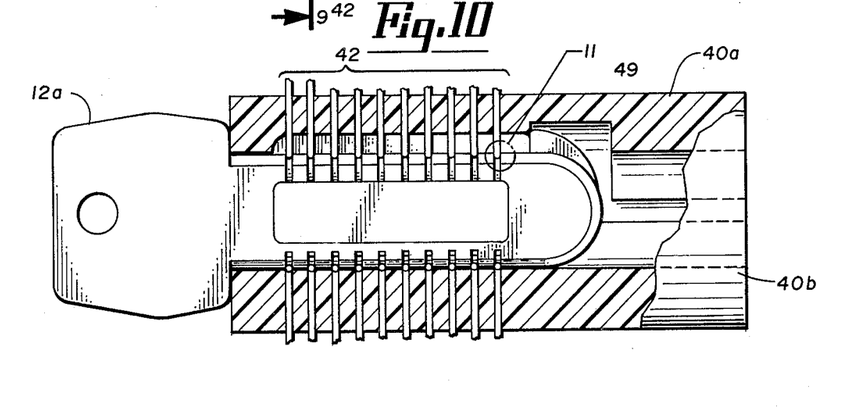
FIG. 10 is a bottom plan with parts cut away of the key and receptacle with key shown in the rotated contact or "locked" position.

The view shown in FIG. 7 is taken along a vertical longitudinal axis plane of the body of the key after it has been inserted in the normal manner with protrusion 46 moving freely along the horizontal channel identified with reference character 44. The key is then rotated and the protrusion 46 ends up in the position shown in FIG. 10 which illustrates the data key receptacle 40 in which a data key has been inserted and rotated into the full contact "locked" position. As shown clearly in FIGS. 3, 7, and 11, the protrusion 46 has a sloping leading surface to assist in the proper vertical insertion attitude of the data key element 10 in the data key receptacle 40.

The trailing edge of the protrusion 46, ie. the edge closest to head 12a of data key 10, also serves an important function. When the key is fully inserted and is rotated 90 degrees clockwise as permitted by the longitudinal track 44 and the turn guidance groove 49, contacts 42 are positioned for contact with leads 16 of memory device 14. The cooperation of the data key insertion notch and the radial turn groove assures that key 10 can only be turned in the proper radial direction since the receptacle provides guidance grooves only in the proper direction. In order to provide for more positive correct positioning of the key when rotated into the operational position, the radial turn guidance groove 49 may include a slight pitch (not shown) so that, as the key is rotated about its axis after insertion, the body is moved slightly forward in the receptacle to bring the tip of key insert body 12b into contact therewith.

The configuration of the data key receptacle 40 and its read contacts 42 is best shown in the section view of FIG. 9. The basic circumference of the keyway 53 is slightly larger, 0.005 to 0.010 inches for example, than the maximum circumference of the data key insert body 12b as shown in FIG. 9. The sides of keyway 53 have recesses 55 to accept the ends of contacts 42.

The external protrusion of leads 42 outside of receptacle 40 is intended to permit relatively simple connection to access device electronics as discussed below. The spacing of the contacts is the same longitudinal spacing as that of the memory device 14 utilized within the key so that it is possible to utilize the same commercially available socket connectors (not shown) to receive the contacts from the receptacle device. The strip socket connectors in turn are readily connectable to various points within the support electronics. This method of connection of the receptacle to the additional electronics allows convenient removal and relatively simple replacement of receptacles.

The data key and its associated access device are designed to work as a set to introduce the encapsulated microelectronic device carried by the data key to other support circuitry. As such, the data key and its associated access device can be viewed as a two part package having a portable part, the data key, and a fixed part, the associated receptacle. The receptacle is always connected into a support circuit such as a door opening unit and many data key devices may be inserted into the receptacle at different times to introduce the unique contents of specific data keys to the support circuit. For example, if the receptacle is connected to a door access control device, many individuals can insert their personal data key into the receptacle associated with the door opening device. if the contents of their respective data key meets the requirements of access through the specific door, the support electronics of the door opening device will actuate the release of the door restraint mechanics to effect access. This illustrates that the data key and receptacle work in conjunction to introduce the data key contents to a higher level device to effect some desired activity. An equally valid application may include the retrieval of the contents of the inserted data key and the display of those contents, ie. the individual's name, address, bank balance or other information on a hard copy printout or other display in a particular format.

As shown in FIGS. 2 and 4, the curved faces 13a and 13b of key body 12b are arcuate to promote a smooth engagement between the contact electrodes 16 and the contacts of receptacle 40. The arcuate surfaces 13a and 13b are displaced from the center of rotation of key body 12b by a greater distance than the sides 13c and 13d to allow key device 10 to be inserted into receptacle 40 without making contact with the contacts thereof during insertion, but permitting engagement of the receptacle contacts with the data key contacts when the data key is rotated after insertion in the receptacle.

Figures 8, 11:
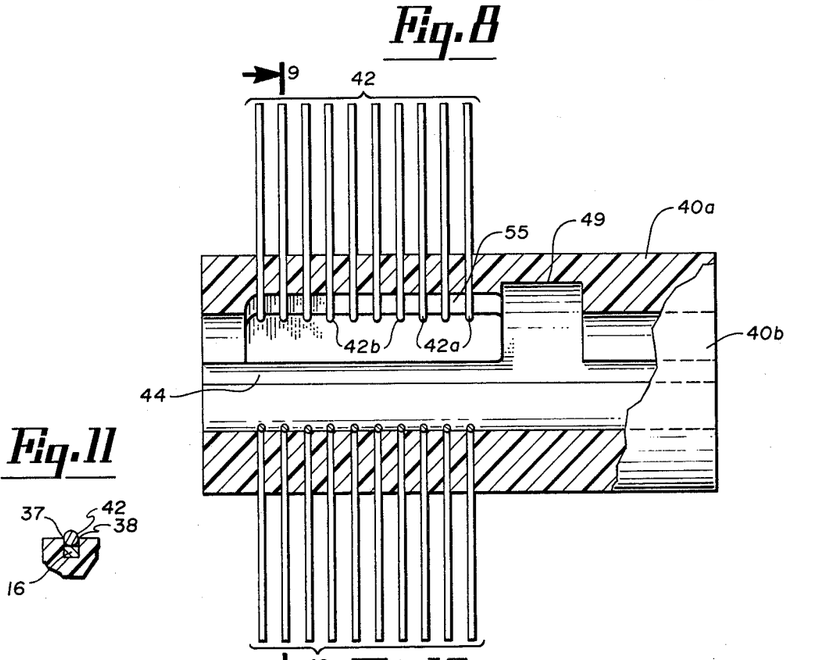
FIG. 8 is a bottom plan of FIG. 7 with part of the receptacle cut away.
FIG. 11 is a detail section of a typical contact area shown in further enlarged scale and taken at 11 in FIG. 10.

FIG. 11 depicts a data key 10 inserted in a receptacle 40 and shows the contact electrodes 16 in engagement with the receptacle contacts 42.

Each contact electrode 16 of key device 10 is protected from direct physical damage as the key is handled by ridges 37 and 38 (best seen in FIG. 3) which are located on either side of each contact electrode. The protective ridges, such as 37 and 38, not only serve the purpose of protecting the electrodes during handling of key 10 and insertion of key 10 into receptacle 40, but they also provide assistance in aligning electrodes 27 of key device 10 with the access electrodes 42 of receptacle 40.

As shown in FIG. 7, for example, the number of receptacle electrodes 42 and key electrodes 16 used in any particular application will preferably be selected to provide N+1 access electrodes on each side of the package where N equals one half of the total number of conductive electrodes utilized on microelectronic device 14.

The "extra" access electrode provided on each side of the data device 10 is illustrated in FIGS. 1, 3 and 7 at 40. The "extra" access electrodes 40 are preferably located at the most distant location from the data key's head 12a. In other words, the "extra" access electrode pair 40 is the first electrode pair of the key device 10 to be inserted into the receptacle 40. This electrode pair is connected conductively through the body 12 of key 10 to serve as a switch within the data key to close a circuit connected to receptacle 40 electronics which are discussed more thoroughly below to indicate that the data key 10 has been fully inserted into receptacle 40 and has been longitudinally turned properly such that the receptacle contacts 42 are properly in contact with contacts 16 of key 10. Use of the interconnected "extra" terminals 40 to verify the correct insertion and rotation of key 10 does not insure that all contacts between the receptacle 40 electrodes such as 42 and the data key 10 contacts 16 are fully secured, but does provide an input to receptacle 40 to utilize further circuitry discussed below to initiate sensing operations and validate proper contact between each of the other access terminals and their associated contact electrodes on the body of the key device 10. Electrodes 40 also insure full insertion of the data key 10. Although the premature turn of key 10 is restricted by physical detents provided on the body 12b of key 10, the switch formed by electrodes 40 and further circuitry to be described below will indicate that the key has been properly inserted and turned and that steady state contact with the receptacle contacts either has been established or will soon be established.

Two articles in the September, 1977 edition of *SCIENTIFIC AMERICAN* entitled "The Fabrication of Microelectronic Circuits", pp. 111–128 and "Microelectronic Memories", pp. 130–145 describe microelectronic circuit components of a type which may be used as element 14 in key 10. These articles are both incorporated herein by reference.

The first article describes at page 126 a packaging technique used as a final step in the manufacture of microelectronic circuits. In this technique, each of the dies are fastened to a metal stamping, known in the art as a lead frame. Fine wire leads are connected between the bonding pads of each die and the electrodes of the package and a plastic cover is molded around each individual die and lead frame with the package electrodes extending exteriorly thereof for establishing electrical contact with the packaged die.

The conventional technique, with some minor modification, may be used to advantage in manufacturing the keys of the invention. Generally, the idea in this embodiment is to mold the plastic cover, referred to above, in the form of the key directly during packaging. The key then uses standard microelectronic dice and lead frames as internal components.

Figure 12:
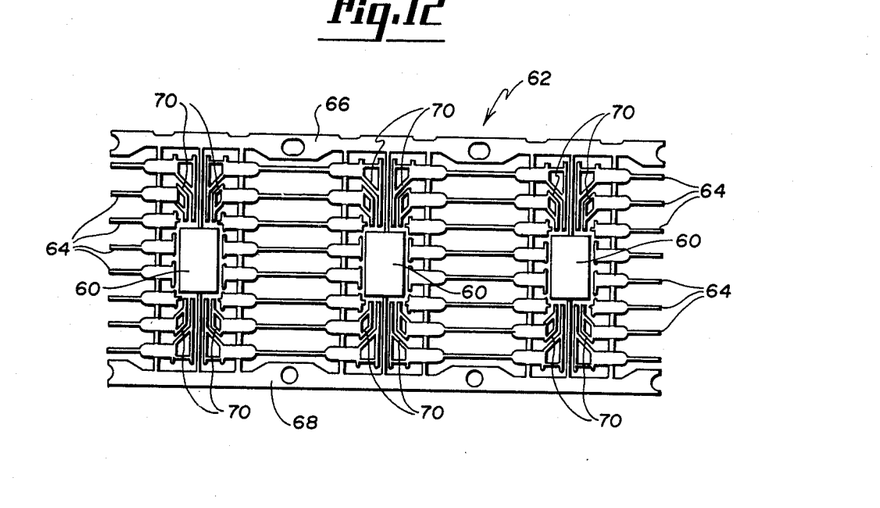
FIGS. 12, 13, 14 and 15 demonstrate the final steps involved in the manufacture of a microelectronic circuit die on a lead frame which is encapsulated in a key-like device of the invention.
Figure 13:
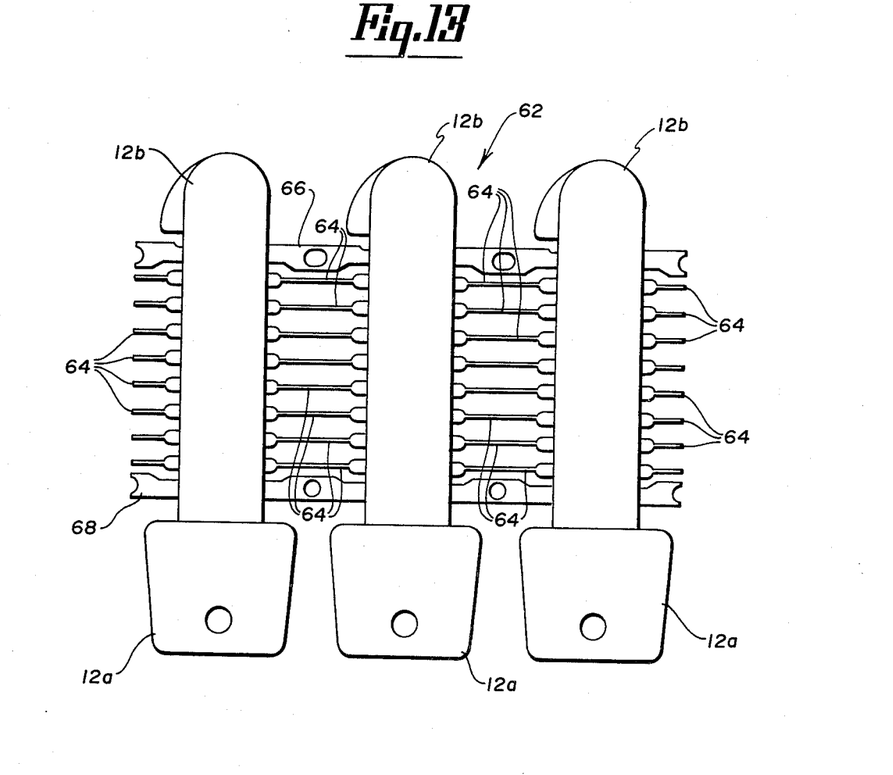
Figure 14:
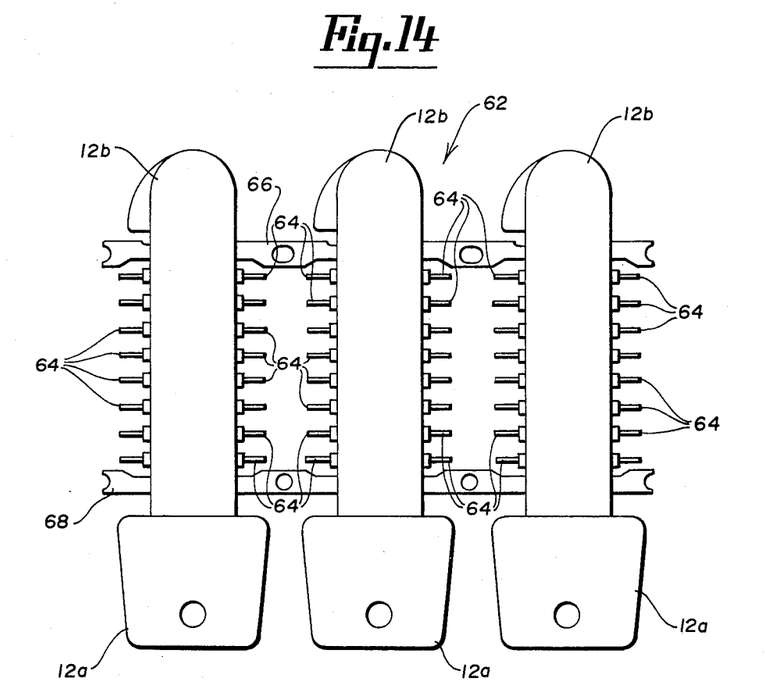
Figure 15:
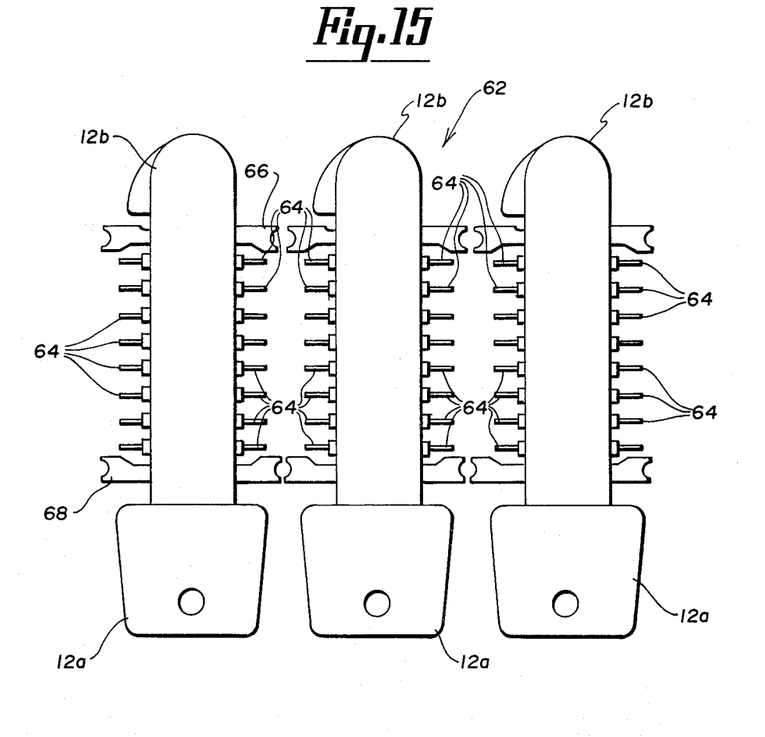

Specifically, referring to FIGS. 12-15, the final steps in the conventional manufacture of a microelectronic circuit are represented by this sequence of Figures. FIG. 12 shows several conventional microelectronic dice, chips or circuits 60 fastened to a series of conventional metal stampings or lead frames 62, each of which has a plurality of electrodes 64 and upper and lower interconnecting metal supports 66 and 68. Fine wire leads 70 are connected between the bonding pads (not shown) of each die 60 to the electrodes 64 of the lead frames. A key-like body having an insert portion 12b and a head portion 12a is molded around each die 60 as shown in FIG. 13 and the units are separated as shown in FIGS. 14 and 15. Each key unit is turned within a low pressure press to shape the package electrodes directly to the shape of the key insert body. The electrodes may be fitted into grooves, similar to those shown in FIGS. 1-4 on insert body 12b. The grooves may be formed when the key body is molded or they may subsequently by formed therein by machining or by placing heated platens against the body. In any event, the package electrodes 64 may be oriented and/or shaped to point in opposite directions on each side of the key body as shown in the earlier Figures. Members 66 or 68 may be used to function as the access electrodes 40 discussed previously.

The specification hereinabove has described, as a "dynamic package", a microelectronic key-like device that facilitates the selective insertion and removal of a specific device with and from a higher level device or circuit. This two part package consisting of a key device and a receptacle reader device, which is connected into a higher level circuit device, combine to make the key's microelectronic circuit an integral part of the higher level circuit. It is not necessary with this "dynamic package" to affix the specific circuit of the "dynamic package" to the higher level device by soldering or fixed strong tension contact. It is possible, with this invention, to dynamically introduce and remove supplemental circuitry contained in a key from the higher level device while the latter continues to operate.

In order to exemplarily describe the data key and receptacle device electronic support circuitry in operation, the following terms will be used. The fixed portion of the dynamic package, that is the receptacle device, and the dynamic portion, that is the data key itself, when combined will be identified as the receptacle-key set. Keep in mind that any data key of a compatible type to the specific reader in the support circuitry may be used with the receptacle to form the instantaneous set.

Generally, from the overall system standpoint, the invention provides a key-like device containing data storage means, preferably in the form of a memory means, and a plurality of leads extending from the encapsulated means to the exterior of the key body. The data storage means is particularly adapted to supplement and cooperate with a higher level circuit means, such as a processor and program memory combination, that is a computer. Interface between the key and higher level circuit means is provided by a suitably designed key receptacle which establishes contact between the key electrodes and the higher level circuit means when the key is inserted into the receptacle. A specific system is described below by way of illustration.

Figure 16:
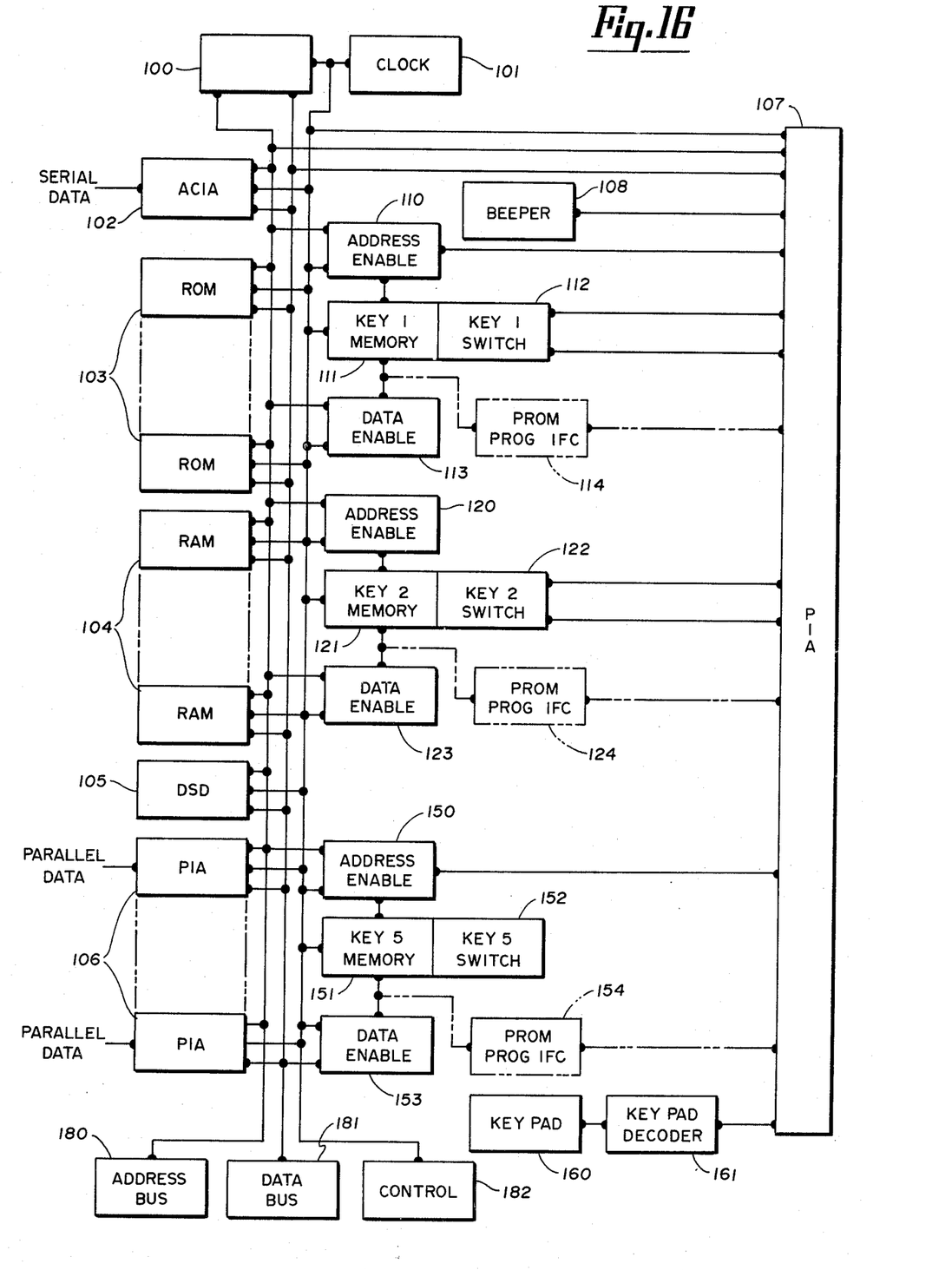
FIG. 16 is a block diagram of an illustrative system using the invention.

FIG. 16 illustrates a typical microprocessor configuration of electronic devices. The vertical center lines 180, 181 and 182, represent the bus structure employed in most microprocessor configurations; specifically the address bus 180, the data bus 181, and the common control line 182. The boxes to the left of these bus lines represent typical devices for a common microprocessor configuration. The Asynchronous Communication Interface Adaptor (ACIA) numbered 102 is a serial interface device that can be used to communicate with serial devices and/or serial communication lines. It is usually employed for serial communications to another microprocessor configuration or a communications line modem. ROM 103 is the acronym for Read Only Memory that may be of the masked, programmable, and/or erasable variety. These devices may exist in any quantity and are used to contain the program that controls the operation of the configuration. RAM is the acronym for Random Access Memory and is illustrated at 104. Like ROM it may exist in variable quantity to comply with the requirements of the configuration. These devices are utilized for work storage memory or scratch pad memory that the program within the ROM may require for intermediate storage. RAM may be either a static storage or a volatile storage; the latter requiring refresh circuitry to retain the data. 105 is a Data Security Device (DSD) whose function is to encrypt and decrypt data text as governed by some dynamic cipher code. Although it is not included in most microprocessor configurations, it has been included in this configuration because of the encrypted data key contents capability that is described in a following section. The Parallel Interface Adaptor (PIA) is for communication to outside devices, like the ACIA, but in a parallel manner instead of a serial manner. The PIA's may exist in any required quantity and are programmed for specific usages. The microprocessor itself is shown in box 100. This device is the programmable device that utilizes the program resident in the ROM to control and perform calculations for all of the other devices in the configuration. Clock 101 provides the clock signals to coordinate the activity of all devices in the configuration. The actual circuitry connections for the typical configuration described above will include other support devices or "chips" and some descrete components. However, since this will vary with the selection of the specific device, the general schematic of FIG. 12 does not show these secondary components. Additionally, the signal connections between the various configuration devices are not illustrated since that will vary with the selection of the microprocessor and with the selection of each component device. Reference to microprocessor references by Motorola (6800 family), Intel (8080, 8086 families, etc.), Fairchild (F8 family), Zilog (Z80), Texas Instruments (TMS 1000, 9000 families), etc. will fully describe typical connections.

The purpose of the receptacle/key set is to dynamically introduce data to the microprocessor configuration at nanosecond speeds and in a variable quantity and from multiple potential data sources. The fixed part of the receptacle/key set, the receptacle reader device is connected into the microprocessor configuration between the address enable device(s), 110 for key slot 1, 120 for key slot 2, etc., and the data enable device(s), 113 for key slot 1, 123 for key slot 2, etc. All pin outs from the receptacle device (FIGS. 8 and 10) will be connected into the address enable or data enable devices except for the two pin outs that control the proper positioning recognition for the receptacle/key set. This pin out pair is connected to a Parallel Interface Adapter (PIA) as two bit positions of the PIA.

The illustration of FIG. 16 shows the potential for five key device sets (Key 1 thru Key 5). However, there may be from one to "n" key device sets as governed by the implementor's application. All key device sets will operate in the same manner. Therefore, the following description of the operation will reference only Key device set No. 1.

The microprocessor configuration is functioning under program control of the program that is contained within the Read Only Memory (ROM). The configuration may optionally contain the devices illustrated in FIG. 16 and/or may contain additional devices as governed by its application. At any rate, the microprocessor is executing instructions from the ROM and controlling all other system devices. In its initial state, there is no data key in the configuration. The program within the ROM is such that its accessable static address domain into memory is limited, programmatically, to the ROM address space and the RAM address space that is part of the static configuration of devices. It will not attempt access to any other address space.

The address enable device 110 and the data enable device 113 are connected to the address bus and data bus, respectively, as well as the control lines. However, if the microprocessor, through its program control does not access these devices, they will not participate in the operation of the configuration. Lines from the address enable device, data enable device, and control lines are connected to the data key access device (combination of 111 and 112), but since there is no data key in the access device, there is no memory (data) that can be accessed. Therefore, all lines to that access device terminate into space at the ends of the access device read heads.

The full insertion of a data key into a receptacle device will align the full insertion detection switch contacts (FIGS. 1 and 3 at 40) at 90 degrees to the receptacle device switch leads. The 90 degree clockwise turn of the data key will place into contact the receptacle device leads via the key switch contacts. This closes the switch and causes the respective bits of the PIA (FIG. 16 at 107) to be set. The microprocessor under control of its program is monitoring the bits of the key control PIA (FIG. 16 at 107). When it recognizes that this bit control is set or "closed", it realizes that a data key has been inserted into key slot 1. Since key slot 1 has a programmatically assigned address space, the microprocessor can now attempt access to the dynamic data key memory by addressing the memory via the address enable device (FIG. 16 at 110) and inputting data via the data enable device (FIG. 16 at 113). If all data key electrodes are not seated with their respective access device heads, certain address lines and/or data lines and/or control lines will not function. This is detected by the microprocessor by attempting input of a specific data pattern from specific memory addresses within the data key. If the requested address does not return the expected data, the microprocessor will wait a few milliseconds to allow the full completion of the clockwise turn of the data key into the access device. This procedure will be repeated until a specified period has elapsed or successful readout is effected. The key inserter will be prompted to retwist the data key if successful contact has not been effected after the repeated access procedures have been executed.

The above describes a double detection procedure to determine the complete configuration of the data key memory into the operating configuration. The key switch alerts the microprocessor that the key is approximately inserted and access attempts can be executed. The proper data patterns from selected address assures the microprocessor that all data key contacts are fully in operable contact with the respective read head electrodes. The microprocessor can now proceed with the input of data from the key or the output of data to the key memory.

The removal of a key is detected by the "opening" of the data key switch via the same PIA bits that alerted the microprocessor of the key's presences in the respective access device slot. The microprocessor is always monitoring the PIA bits. When the access device addressable memory domain no longer contains a data key, the microprocessor will not attempt further access to that address domain until another data key is properly inserted into that access device.

The microprocessor configuration can be performing many other functions in addition to supporting the access devices. Its program control is constantly monitoring the key control PIA (FIG. 16 at 107) to determine what access device can and cannot be accessed. Therefore, data keys may be dynamically inserted into a receptacle at any time concurrently with the microprocessor's operation and concurrently with the insertion, removal, or residence of data keys in any other receptacle slot that is supported by that microprocessor configuration. Therefore, at any time, the microprocessor accessable memory domain is variable as governed by the presence or absence of data keys in the respective access devices. Any data key may be inserted into any of the available receptacles that are of the same type.

Any data key that is either a RAM (Random Access Memory) device or a ROM device that is intended for read only operation will require three lines to the PIA. Two lines are for switch control and the third line is for chip enable which selects that memory device for activity. Other lines may be used for programming PROM (Programmable Read Only Memory) devices as optionally illustrated by box 114 of FIG. 16.

The operational discussion above has assumed that the key contained a memory device. However, since all devices within the microprocessor configuration interface in a common manner to the address bus, data bus, and the control lines, any device may be enclosed within the key design and be dynamically inserted into an operational microprocessor configuration by utilizing the same techniques described above for the memory device. Therefore, any compatible device will be recognized as present by the internal key switch closure within the access device and via the PIA recognition procedure. The control program of the microprocessor must then recognize this presence and access the key microelectronic device in compliance with the type of device that is within that specific key. It may be a source of data such as POM, PROM, EPROM, or EAROM. It may be a program to assist in control of the microprocessor configuration or to augment the same (some form of ROM or RAM). It may be RAM that is introduced to increase the amount of working storage memory for the configuration. It may be a peripheral device such as ACIA, PIA, UART, etc. that is introduced to dynamically reconfigure the peripheral network of the microprocessor configuration. In summary, it may be any dynamic extension and/or reconfiguration of the microprocessor configuration. The control program of the configuration is written to handle these dynamic reconfigurations as per the application of the configuration. Therefore, this design is more than a "data key" design; it is a dynamic microelectronic device design that embodies the package means and electronic means to effect the same.

The embodiment of microelectronic memory within the data key provides a random access storage media for the owner of the key and for all accessing circuitry. Therefore, it is normal procedure to retrieve only that data from the key's microelectronic memory that is desired; the entire data key's contents need not be accessed when only selective data elements are desired. The previous works required that all data of a remote data means, such as the key herein, be utilized to compare bit by bit with a like memory at the central site processing complex. The design described herein allows the implementor to organize the data within the key's microelectronic memory in any desirable manner. It is anticipated that the data will be separated into fields of data items where each data item as an identifying "header" followed by the actual information data. For example, the header could identify the data item as the owners name field and the information section that follows would have the owners actual name. With such conventions, a high level equipment could request the access device and its support circuitry to return the "name" of the individual whose key is in a specific access device. The access device support microprocessor would then scan the key memory in search of a byte that will determine by encoding if the field is the name field. If it is not, the scan activity proceeds in search of the next field. If it is the name field, the information part of that data item is retrieved and forwarded to the requesting equipment. This simple procedure illustrates that the key's content is fully randomly accessible, selective data items can be identified, and selective data information can be retrieved. The entire keys contents need not be removed for usage. The key access algorithm can be improved by use of index words at low addresses within the data key. However, since the microelectronic memory is accessable in nanoseconds, it would not be advantageous, in most cases, to utilize an extensive indexing structure for the key data.

The procedures described in the previous paragraph may also be extended to selectively write data into the key's microelectronic memory. If the memory is Random Access Memory (RAM) of a non-volatile variety or EAROM, the access circuitry can selectively identify data items and modify the contents of the field by writing new data into the specific addresses. Alternatively, the entire key contents could be reorganized and rewritten in its entirety back into the data key. The latter would be done if field length changed, fields were eliminated, field identifiers were changed, etc.

If the memory is Programmable Read Only Memory (PROM), the bytes that are already programmed cannot be modified. However, the areas of the key's PROM that have not been programmed can be programmed without altering the previous contents. It is also possible to nullify a data field identifier by setting all bits in the identifier byte and to rewrite the corrected data field complete with new identifier and data into a previously unused area of the keys memory.

An extension of the field nullify operation is to nullify the entire key for future usage. This is done by setting all bits of the key memory and nullifying all fields and all unused areas. This procedure would be exercised if a stolen or lost data key was being erroneously used.

If the memory is an Erasable Programmable Read Only Memory (EPROM), its contents may be erased by the proper exposure to ultraviolet light for a specified length of time. This is not a selective erasure, however, and would be used only if a key package is to be reused. It would be more effective to utilize the field nullify procedure programmatically to control logical destruction of the data contents of a key. This procedure does not require any additional circuitry and light source. This dynamic PROM programming capability already exists in the access device circuitry and is selective and manageable.

The previous paragraphs presenting selective data modification have assumed that the data keys in reference were individual's keys that were input to some receptacle. The receptacle in conjunction with its higher level equipment, upon stimulus of the key insertion, requests certain data from the key's memory in order to carry out its specific function. Even though there may be many fields of different data within any given key, the specific access device will only seek the facility access authorization field and would be unconcerned about any other field.

If the data key contained Random Access Memory (RAM) that was to be used only for microprocessor work space, there would be no organization of data within the key's memory and no need for retention of data when the key was removed from the access device. The microprocessor would use the memory space that the key provides for any temporary work storage that is required. Therefore, the RAM may be static or volatile as governed by the support circuitry. This type of key usage allows random reads and writes with no need for additional control.

The data key may also contain ROM that contains an executable program or routine for the microprocessor. It may also contain tables and/or directives for usage by another microprocessor program. In either case, the key's contents can be thought of as program instead of data. The ROM may be masked programmed in which case it cannot be written into. The other versions of ROM, EPROM and PROM, could also be used but will probably not be selectively written into when the key is used for program instead of data. Any key contents modifications will be accomplished by other means than the access device when the key is used for this purpose. This is noted to recognize that the key is a read/write device for which the write capability is inherently restricted or controlled dependent on the specific usage of the data key.

For example, the key package may contain a microelectronic memory device that is assigned to a specific individual and which contains data or information that is unique to that individual. Such information is dependent on the purpose of the key and may include information such as:

| | |
|---|---|
| *Individual's Name | *Individual's Birth Date |
| *Individual's SSN | *Drivers License No. |
| *Facility Access Codes | *Computer Access Codes |
| *Data Base Access Codes | *Charge Account Nos. |
| *Billing Address | *Individual's Address |
| *Individual's Phone No. | *Credit Account Balances |
| *Employee No. | *Data Element Access Code |
| *Employment Address | *Misc. Authorization Nos. |
| *Physical Description | *Blood Type |

Each application of the data key, when used as a personal data base, will require different combinations of information. An access control application might require name, facility access codes, computer access codes, data base access codes, employee no., data element access codes, etc. that are encoded into the key. A credit control application may require name, SSN, drivers license no., charge account no., billing address, individual's address, individual's phone no., credit account balance or credit limit, etc. Simple attendance control applications may require only employee no. The information is definitely a function of the application and the design employed.

This information may be critical information that, in the hands of the wrong individual, could be damaging to the key owner and/or the application of the individual's personal data base. It may, therefore, be desirable to protect the contents of the data key from unauthorized usage in many instances.

This necessary protection may be accomplished by encrypting the data stored within the data key under control of an encryption/decryption code that is only known by the individual that has authorization to use the specific data key. At the same time of "programming" the specific information into the specific data key, that information will be encoded by data item identification and the respective information for each data item and staged into the memory of the data key programming device. The individual for which the key is being programmed will then input his/her unique encryption number; a number of a variable amount of digits that is known only by the individual and is a number that will always be remembered by the individual. This encryption code will then be used by the programming device electronics to encrypt the staged encoded data items and write that encrypted data into the data key. All data within the data key is then scrambled or encrypted.

To use such a data key, the individual will insert the data key into a receptacle device when it became necessary to execute some function of the overall application, i.e., access to a facility. When the data key is properly seated in the receptacle device, the access device will acknowledge the same by an audible or visual prompt such as a beeping sound or a lamp activation. The individual will then input his/her encryption code by a key pad on the access device or by some other acceptable means. This code will be used by the access device via its Data Security Device (DSD) (FIG. 16 at 105) to decrypt the data in the data key. If the proper encryption/decryption code was utilized, the contents of the key will decrypt into the proper "plain text". The information can then be used by the access device to validate that the proper owner is using the data key and be prepared to carry out the functions of that specific access device, i.e., find the access code data item and grant/restrict access to a facility. If the proper encryption/decryption code was not used, the information will decrypt as "garbage" which is detected by the access device and the usage of the data key is restricted. At this point, dependent upon the application, the access device can again request input of the decryption code in case an input error occured or it may destroy the contents of the data key by nullifying all data bits.

The encryption/decryption methods that are employed may be an acceptable method. However, it is recommended that the National Bureau of Standards Encryption Standard be utilized. Microelectronic devices do exist from numerous manufacturers for this purpose. This device is illustrated in FIG. 16 at 105. Except specifications are available from Motorola or Intel.

A specific access device can determine if a data key contains encrypted data or "normal" encoded data at the time of the key insertion. There is a specific byte of information within the data key that can be reserved to indicate this option. Therefore, an access device can access the data in both encrypted and un-encrypted data keys as long as the data key is of the proper type (proper pin outs, pin counts, etc.) for the specific access device. If un-encrypted data, the data is directly accessed to the data key. If encrypted, the data decryption code is requested, the information is decrypted previous to the usage of the data.

The data key is preferably "programmed" by methods of compatible with the type of microelectronic memory used in the specific data key. If it is a mask programmable ROM, it is programmed during the "chip" manufacturing process. If it is a programmable ROM such as PROM or EPROM or if it is an electrically alterable ROM (EAROM), data may be programmed into the data key via the receptacle device. The "programming" receptacle device will be connected to a higher level equipment that would facilitate information input, display, validation, and, optionally, encryption code input.

Figure 17:
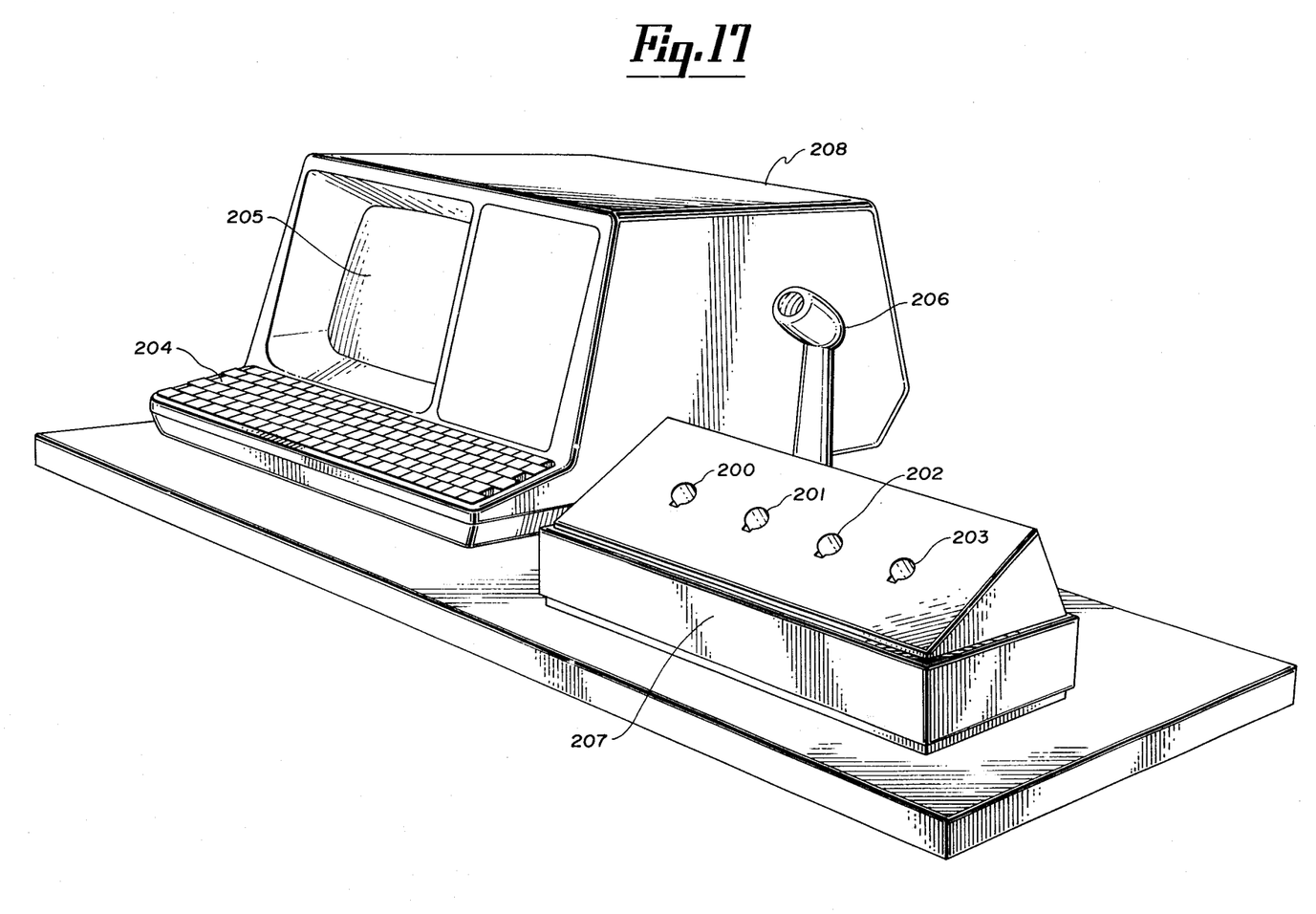
FIG. 17 is a schematic illustrative showing of one type of apparatus which may be used in programming the data key.

A typical higher level equipment configuration to accomplish data key programming is illustrated in FIG. 17 i.e., a Data Key Programmer.

This equipment consists of a display device e.g., a CRT or LED 205, an input key board 204, an encryption code input device that may be a microphone 206 or a numeric input key pad (not shown), and receptacle device that contains four receptacle input reader devices or key slots 200, 201, 202, and 203. A microprocessor and associated support devices are enclosed within the CRT chasiss 208 to control the keyboard, the CRT, and the commands to the receptacle device.

The operation of the Data Key Programmer is by a trained operator. That operator will insert his/her personal data key into key slot 200 which will authorize usage of the Data Key Programmer by acceptible access codes encoded within the individual's key. Key slot 201 will hold a second data key that contains directives and data formats to guide the operator in the "programming" of the data key that is intended to be programmed during a given data key create session. This key will contain the prompts that will be displayed on the CRT screen such as:
NAME:
ADDRESS:
DRIVERS LICENSE NO.:
SITE ACCESS CODE:
SSN:

It will also contain the data item encoding standard that is desired for those respective fields. Alternatively, floppy discs, cartridge tapes, etc. may serve the purposes of the keys intended for slot 201.

The operator will then key in the data information for each prompted field relative to the individual for which the data key is being programmed. This information may come directly from the individual or may be from a paper form that was completed by or for the individual.

When all data is input that will be programmed into the data key, a blank or non-programmed data key will be inserted into key slot 202. If data encryption is to be used, the individual will input his/her encryption code via a numeric key pad, microphone, or other provided means. The operator then depresses the key program interlock which will cause the input data from the input screen to be encoded and, optionally, encrypted and written into the blank data key that resides in key slot 202.

The actual programming of the data key is accomplished by the receptacle itself. It contains the PROM programming electronics shown in FIG. 16 at 114, 124, 134, etc., the key accessing electronics, and, optionally, the data security encryption device. The access device is connected to the Data Key Programmer command console via the access device's ACIA interface shown in FIG. 16 at 102. The higher level programmer console will issue the encoded data through this link with a command to program the data key in a specific slot. The data is encoded by the console microprocessor since it can utilize the directives from the data key in Slot 201 to execute the encode function. The encryption code and its command is also issued if encryption is being done. The access device then accepts the encoded data and encrypts that data, if desired, and writes the data into the microelectronic memory that resides in the data key package.

Key slot 203 is reserved for keys that must be read to determine the owner of a lost key. It is also used to copy the contents of a key in slot 203 to the screen where it may be updated and written into another key that would reside in slot 202. If a lost key is encrypted, the owner of the lost key must be present to decrypt the contents of the key before even the data key programmer operator can recognize the data of that specific key. This provides another level of protection to the key owner since there is no record of his/her encryption/decryption code that could be misplaced.

The Data Key Programmer can also be used to "program" ROM keys that will contain executable program code for some devices' microprocessor, that will contain directives or tables for a microprocessor, or any other purpose that the portable microelectronic memory provided by the data key is applied. The "prompting" key that is inserted in key slot 201 determines the procedures and encoding schemes that the operator will utilize in the specific key create session.

Microelectronic circuits or devices that are enclosed within the key package are "programmed" only if the microelectronic device is a memory device that will contain data for the specific individual or specific purpose of a given application. There is no need to program a memory device that will be used only for work storage increment on some microprocessor configuration. There is also no need to program a mask programmable ROM device that is already programmed in manufacture and cannot be modified. Any microelectronic device that does not have the capacity for memory cannot contain data and is therefore not programmable. In these cases, the microelectronic device is simply enclosed within the key package and they are ready for use on any access device or electrical system that is of a compatible type.

Having described the invention, the exclusive rights thereto, are set forth as follows:

I claim:

1. In combination:
   a key-like device having head and insert body portions, the insert body portion being adapted for insertion into a receptacle and rotation therein to a "locked" position and including in cross section
   a major dimension with opposing upper and lower surfaces,
   a smaller minor dimension with opposing side surfaces, and
   a plurality of spaced transverse grooves formed on the major surfaces, and
   An electrical circuit element encapsulated within the key, the element including a plurality of electrical leads, each of which extend into one of the grooves and lie therein to form a plurality of electrical contacts;
   a receptacle defining a keyway for receiving the key insert body portion and the spaced electrical contacts carried thereby,
   the keyway including a plurality of correspondingly spaced electrical contacts,
   insertion guide means in the keyway for guiding the insert body portion during insertion with the contacts thereof angularly displaced from the keyway contacts,
   rotation guide means in the keyway for guiding the insert body portion during rotation to a "locked" position in the receptacle and bringing the insert and keyway contacts together in contacting pairs, and wherein
   each keyway contact comprises a conductive lead having a resilient bend portion positioned in the keyway for contacting a correspondingly spaced insert body contact upon rotation of the insert body to the "locked" position in the receptacle.

2. A key-like device having head and insert body portions,
- the insert body portion being adapted for insertion into a receptacle and rotation therein to a "locked" position, and including in cross-section
  a major dimension with opposing upper and lower surfaces,
  a smaller minor dimension with opposing side surfaces, and
  a plurality of spaced transverse grooves formed on the major surfaces, and
- an electrical circuit element encapsulated within the key, the element including a plurality of electrical leads, each of which extend into one of the grooves and lie therein to form a plurality of electrical contacts.

3. The key according to either claim 1 or 2 wherein the electrical circuit element comprises a microelectronic solid state circuit.

4. The key according to either claim 1 or 2 wherein the transverse grooves are of such a depth that the leads are below the major surface when seated therein.

5. The key according to either claim 1 or 2 wherein the cross-sectional shape of the insert body is generally rectangular with the major surfaces being outwardly curved and the minor surfaces being substantially flat.

6. The key according to either claim 1 or 2 wherein the cross-sectional shape of the insert body is generally elliptical.

7. The key according to either claim 1 or 2 wherein the insert body portion also carries a pair of switch contacts, one on each of the major surfaces.

8. The key according to claim 7 wherein the switch contacts are seated in transverse grooves on the insert body portion and the plurality of electrical contacts in the other spaced grooves are positioned between the switch contacts and the head portion of the key.

9. The key according to claim 1 or 2 wherein the electrical leads in the transverse grooves extend in the direction in which the key is adapted for rotation.

10. A receptacle defining a keyway for receiving a key-like insert body carrying spaced electrical contacts:
   the keyway including a plurality of correspondingly spaced electrical contacts;
   insertion guide means in the keyway for guiding the insert body during insertion with the contacts thereof angularly displaced from the keyway contacts;
   rotation guide means in the keyway for guiding the insert body during rotation to a "locked" position in the receptacle and bringing the insert and keyway contacts together in contacting pairs, and wherein
   each keyway contact comprises a conductive lead having a resilient bend portion positioned in the keyway for contacting a correspondingly spaced insert body contact upon rotation of the insert body to the "locked" position in the receptacle.

11. The receptacle according to either claim 1 or 10 wherein the conductive lead comprises a wire member, the bend portion thereof being formed by a right-angle bend at one end thereof.

12. The receptacle according to claim 11 wherein the end of the wire member is held within the receptacle in a fixed position.

13. The receptacle of claim 11 wherein the keyway contacts comprise two oppositely disposed sets, the right-angle bends of each set extending in opposite directions.

14. The receptacle according to claim 1 wherein the keyway is circular in cross-section, the diameter thereof corresponding substantially to the major dimension of the body insert portion.

15. In combination:
   at least one portable device enclosing a microelectronic circuit element having a plurality of electrodes extending therefrom, the electrodes extending to the exterior of the device and functioning as electrical contacts, the device being constructed and arranged for insertion into a receptacle and being unpowered electrically until so inserted;
   at least one receptacle for receiving the device, the receptacle including a plurality of electrical contacts arranged to contact the device electrode contacts upon its insertion into the receptacle, and
   electrical operating circuit means electrically connected to the receptacle contacts for operating in combination with the device when it is inserted into the receptacle, the operating circuit means comprising a powered microprocessor including a bus structure, the microprocessor being capable of functioning independent of any connection with the device and being so constructed and arranged as to have direct access to the microelectronic circuit element of the device via the electrical contacts upon insertion of the device into the receptacle whereby the microelectronic circuit element functions as a directly accessible part of the microprocessor bus structure.

16. The combination of claim 15 wherein the microelectronic circuit element is a multiple bit memory element and the plurality of electrodes provide bus and power connection therewith.

17. The combination of claim 15 wherein the state of the microelectronic memory is alterable by the microprocessor.

18. The combination of claim 15 wherein the microelectronic circuit element includes memory storage capability.

* * * * *

UNITED STATES PATENT AND TRADEMARK OFFICE
CERTIFICATE OF CORRECTION

PATENT NO. : 4,297,569
DATED : October 27, 1981
INVENTOR(S) : William P. Flies

It is certified that error appears in the above-identified patent and that said Letters Patent are hereby corrected as shown below:

Column 6, line 9, "if" should be --If--.

Column 10, line 41, "address" should be --addresses--.

Column 10, line 60, "device" should be --devices--.

Column 14, line 39, "Except" should be --Exact--.

Signed and Sealed this

Second Day of March 1982

[SEAL]

Attest:

*Attesting Officer*

GERALD J. MOSSINGHOFF

*Commissioner of Patents and Trademarks*